UNITED STATES PATENT OFFICE.

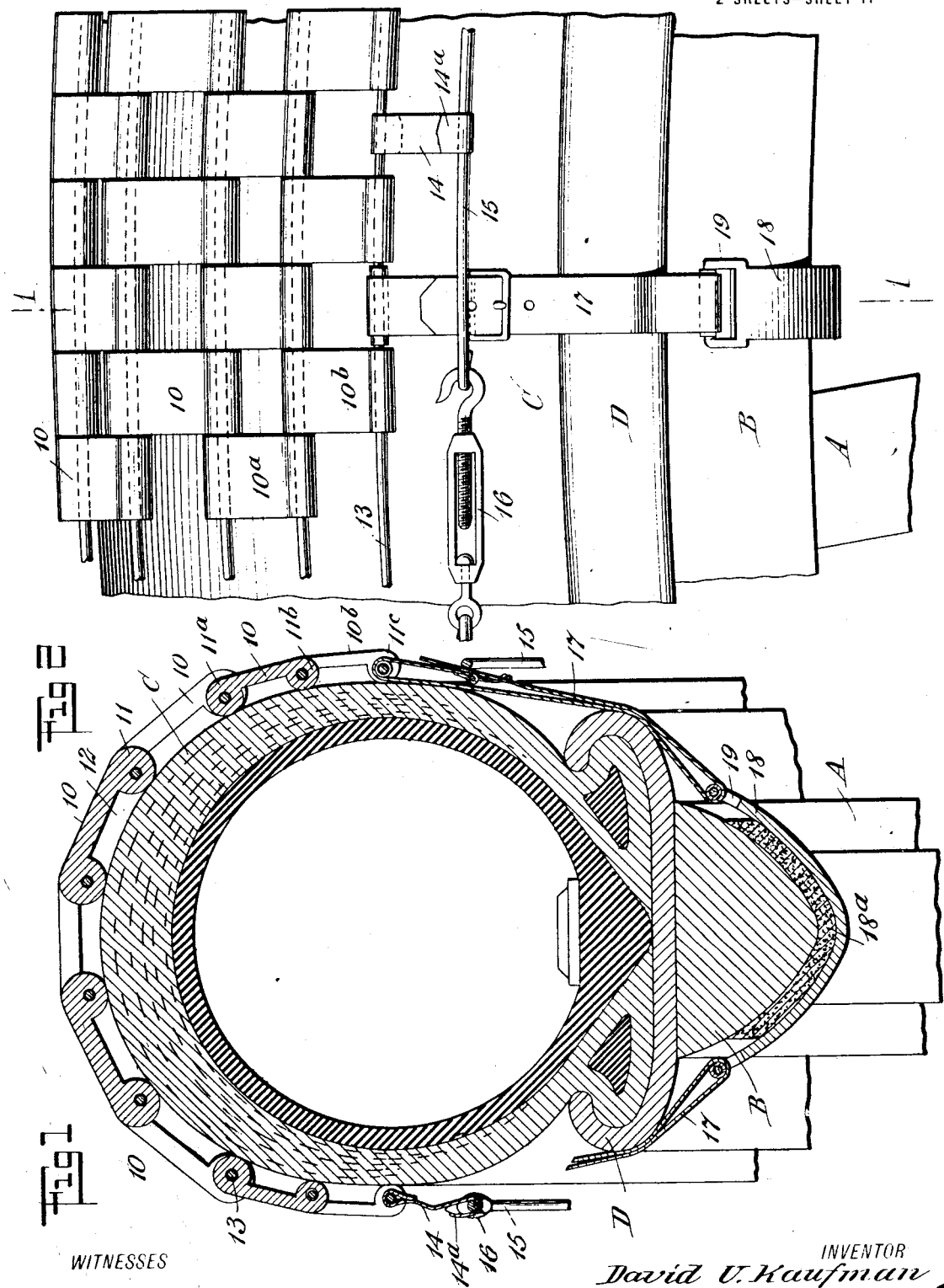

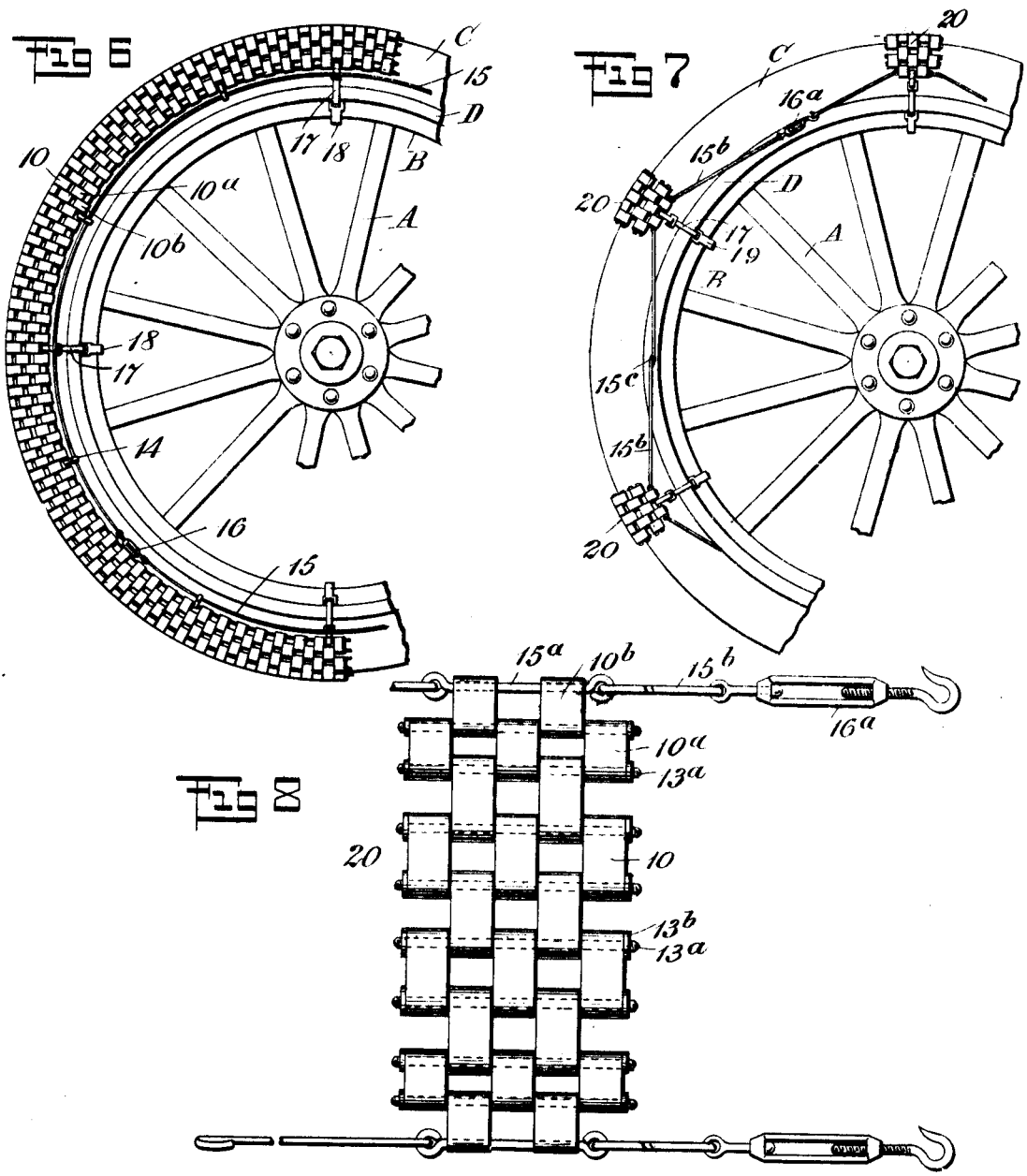

DAVID V. KAUFMAN, OF NEW YORK, N. Y.

ANTISKIDDING DEVICE.

1,142,583.  Specification of Letters Patent.  Patented June 8, 1915.

Application filed January 14, 1914. Serial No. 812,007.

*To all whom it may concern:*

Be it known that I, DAVID V. KAUFMAN, a citizen of the United States, and a resident of the city of New York, borough of Manhattan, in the county and State of New York, have invented a new and Improved Antiskidding Device, of which the following is a full, clear, and exact description.

My invention relates to an attachment for the wheels of automobiles and other vehicles employing similar wheels, and an object of the invention is to provide a device of the indicated character which may be readily applied to the wheel.

A further object of the invention is to provide an anti-skidding device composed of elements of a character capable of embodiment in an attachment presenting a substantially complete covering for the tread of a tire, or in separated sections.

A further object of the invention is to provide an anti-skidding device composed of elements so formed and arranged as to provide for the free circulation of air, whereby to minimize the possibility of burning.

The invention resides in the novel features and combinations hereinafter more particularly described in the claim.

Reference is to be had to the accompanying drawings forming a part of this specification, in which similar characters of reference indicate corresponding parts in all the views.

Figure 1 is a cross sectional view of an anti-skidding device embodying my invention, showing the same applied; Fig. 2 is a fragmentary side elevation; Figs. 3, 4 and 5 represent respective views of graded blocks, a series of which are assembled and held together to prevent skidding; Fig. 6 is a partial side elevation illustrating the anti-skidding device when formed to extend completely around the tire tread; Fig. 7 is a similar view showing a modification in which separated anti-skidding sections are applied to the tire; and Fig. 8 is a plan view of one of the sections shown in Fig. 7.

The attachment is applicable to any approved form of wheel A, here shown as having a rim B, a tire C, and a clencher rim D.

In constructing the attachment a series of blocks are provided, which are linked together in alternate arrangement, the blocks at the tread being designated by the character 10; the blocks adjacent to the tread are designated by the numeral 10ª, and succeeding blocks along the sides by the character 10ᵇ. At the ends each block is formed with a bead or rib 11, that present projections on the inner face, leaving a recess 12 between the respective beads. The blocks are linked together alternately in staggered relation by flexible wires 13, or other equivalent flexible elements which extend in the form shown in Fig. 2, peripherally around the tire, the beads 11 being apertured to receive the said wires. The arrangement of the parts is such that the blocks have pivotal movement on the connecting wires, and may assume the transversely curved form of the tire C. The staggered form of the blocks presents spaces between alternate blocks, which, in connection with the space 12 beneath each block, afford ample circulation of air so as to prevent overheating; moreover, the spaces between and beneath the blocks permit the expansion of the tire surface more or less into the recesses so as to afford a better gripping action of the blocks on the tire to overcome the tendency of creeping. The beads 11 on the blocks 10 at the front of the tread are larger than the beads on the blocks at and toward the sides of the tire; thus the bead 11ª ᵈat one end of a block 10 at a side portion of the tread is larger than the bead 11ᵇ at the other end, and similarly the beads 11ᶜ on the blocks 10ᵇ at one end are smaller than the beads at the other end of the block. The purpose of the gradation in the size of the beads is to provide a larger recess 12 beneath each block located directly at the tread than beneath the blocks at the sides, since the heating will be greater at the tread, and the reduction of the size of the beads toward and at the sides results in a less total width of the applied attachment, while providing sufficient circulation of air at the sides where the heating is less. The reduced size of the beads 11ᵇ, 11ᶜ, on the side blocks, it will be seen brings the under surface of the blocks closer to the tire surface, which gives a net reduction in the size of the space beneath the blocks, notwithstanding the slight increase of space due to the lesser diameter of the reduced beads. Moreover, it will be seen that the blocks toward the side are of reduced length, which further reduces the air space.

It is to be noted that by providing the peripherally running elements 13 for retaining the blocks, and employing blocks of the form described for receiving said elements, the blocks present their rounded side portions toward the sides of the tread, and present their flat ends in the direction of rotation to effect a better gripping action on the ground. This disposition of the blocks also results in peripherally running spaces instead of transversely running spaces, and said spaces will, moreover, be thus open at the front and back instead of at the sides, which results in a free circulation of the air caused by the rotation of the wheel, since the spaces range with the direction of running. The circulation of the air is made especially free by means of the overlapping staggered relation of the blocks which provide alternate radially opening air spaces intervening in each peripheral series of under spaces, and intersecting the latter.

To secure the attachment to a tire, I provide additional links 14, pivotally connected with those peripheral wires 13 adjacent to the rim, and these links receive binding or clamp wires 15 which extend around the tire and have interposed therein a turn-buckle 16. The links 14 have snaps 14$^a$, or an equivalent formation at their lower ends for the engagement of the wires 15, so as to permit a lateral entrance and removal of the wires. In addition to the clamping wires 15, I provide for strapping the attachment to the rim B, there being side strap sections 17 and an intermediate strap section 18, the latter having loops 19 or the like, to receive the straps 17. The intermediate straps extend transversely at the inner side of the rim B, and may be provided with cushions 18$^a$ of felt or equivalent material to prevent marring of the rim.

In the form shown in Figs. 1, 2 and 6, the blocks are assembled in such relation as to extend completely around the tire continuously, but it is possible to assemble the blocks in separated series to form separate anti-skidding sections designated generally by the numeral 20, as shown in Figs. 7 and 8. A series of blocks of the form described are alternately linked by short wires or rods 13$^a$, washers 13$^b$ being preferably employed at the ends, and the side blocks 10$^b$ receive short wires or rods 15$^a$, the short rods of the respective sections 20 being connected by clamp wires 15$^b$, one or more of which may be provided with a turn-buckle 16$^a$, while others of the clamp wires are formed in sections articulated by interlocking eyes, as at 15$^c$. The straps 17, 19, may be employed with this form in securing each section 20, in addition to the connecting wires 15$^b$.

Having thus described my invention, I claim as new and desire to secure by Letters Patent:

An anti-skidding device comprising blocks, and means for connecting the blocks together in staggered relation, said blocks presenting ribs at the under sides thereof, said ribs running peripherally and forming air circulating spaces open front and back, the ribs being of reduced size from the tread radially inward at the sides, and the said blocks having the reduced ribs being successively of reduced length radially inward from the tread.

In testimony whereof I have signed my name to this specification in the presence of two subscribing witnesses.

DAVID V. KAUFMAN.

Witnesses:
ARTHUR TAYLOR,
JOHN E. HAGMAYER.